United States Patent
Wang et al.

(10) Patent No.: US 11,456,512 B2
(45) Date of Patent: Sep. 27, 2022

(54) BATTERY COVER PLATE ASSEMBLY, SINGLE CELL BATTERY, BATTERY MODULE, POWER BATTERY PACK, AND ELECTRIC CAR

(71) Applicant: BYD COMPANY LIMITED, Guangdong (CN)

(72) Inventors: Xinyue Wang, Shenzhen (CN); Luxia Jiang, Shenzhen (CN); Shichao Hu, Shenzhen (CN); Peng Lu, Shenzhen (CN); Han Cheng, Shenzhen (CN); Keli Yang, Shenzhen (CN)

(*) Notice: Subject to any disclaimer, the term of this patent is extended or adjusted under 35 U.S.C. 154(b) by 124 days.

(21) Appl. No.: 16/626,829

(22) PCT Filed: May 28, 2018

(86) PCT No.: PCT/CN2018/088619
§ 371 (c)(1),
(2) Date: Dec. 26, 2019

(87) PCT Pub. No.: WO2019/001192
PCT Pub. Date: Jan. 3, 2019

(65) Prior Publication Data
US 2020/0168884 A1 May 28, 2020

(30) Foreign Application Priority Data
Jun. 28, 2017 (CN) .......................... 201710510436.9

(51) Int. Cl.
*H01M 50/531* (2021.01)
*H01M 50/116* (2021.01)
(Continued)

(52) U.S. Cl.
CPC ....... *H01M 50/531* (2021.01); *H01M 50/116* (2021.01); *H01M 50/147* (2021.01);
(Continued)

(58) Field of Classification Search
CPC ............ H01M 50/531; H01M 50/394; H01M 50/204; H01M 50/30; H01M 50/545;
(Continued)

(56) References Cited

U.S. PATENT DOCUMENTS 6,265,096 B1 * 7/2001 Tucholski ......... H01M 50/3425
429/53
2010/0028724 A1 2/2010 Byun et al.
(Continued)

FOREIGN PATENT DOCUMENTS

CN 104134776 A 11/2014
CN 205564868 U 9/2016
(Continued)

OTHER PUBLICATIONS

Partial Translation of CN-109148746-A for S/N U.S. Appl. No. 16/626,829; Human written translation by a USPTO translator of [0037] of instant application's Foreign Priority application (p. 7 lines 11-22), used to obtain a clearer understanding of the "silicone [ketonic] ester" material as claimed (translated 2021) (Year: 2019).*
(Continued)

*Primary Examiner* — Matthew T Martin
*Assistant Examiner* — Jessie L. Walls
(74) *Attorney, Agent, or Firm* — Calfee Halter & Griswold LLP

(57) ABSTRACT

A battery cover plate assembly includes a cover plate, an electrode terminal, a current interrupt structure, and an arc extinguishing portion. The electrode terminal is disposed on the cover plate and includes an electrode inner terminal and an electrode outer terminal. The electrode inner terminal and the electrode outer terminal are electrically connected through the current interrupt structure. The current interrupt structure is capable of disrupting the electrical connection between the electrode inner terminal and the electrode outer
(Continued)

terminal under the action of a gas pressure. The arc extinguishing portion is configured to reduce an electric arc generated when the current interrupt structure disrupts the electrical connection between the electrode inner terminal and the electrode outer terminal. When the electrical connection between the electrode inner terminal and the electrode outer terminal is disrupted, an arcing effect is generated due to high voltages at positive and negative electrodes of the battery.

11 Claims, 2 Drawing Sheets

(51) Int. Cl.
| | |
|---|---|
| *H01M 50/342* | (2021.01) |
| *H01M 50/147* | (2021.01) |
| *H01M 50/578* | (2021.01) |
| *H01M 50/572* | (2021.01) |
| *H01M 50/545* | (2021.01) |
| *H01M 50/30* | (2021.01) |
| *H01M 50/204* | (2021.01) |
| *H01M 50/574* | (2021.01) |
| *H01M 50/583* | (2021.01) |
| *H01M 50/16* | (2021.01) |
| *H01M 50/383* | (2021.01) |
| *H01M 50/20* | (2021.01) |
| *H01M 50/543* | (2021.01) |
| *H01M 50/317* | (2021.01) |

(52) U.S. Cl.
CPC ......... *H01M 50/20* (2021.01); *H01M 50/204* (2021.01); *H01M 50/30* (2021.01); *H01M 50/342* (2021.01); *H01M 50/3425* (2021.01); *H01M 50/394* (2021.01); *H01M 50/543* (2021.01); *H01M 50/545* (2021.01); *H01M 50/572* (2021.01); *H01M 50/574* (2021.01); *H01M 50/578* (2021.01); *H01M 50/583* (2021.01); *H01M 50/16* (2021.01); *H01M 50/383* (2021.01); *H01M 2200/20* (2013.01); *H01M 2220/20* (2013.01)

(58) Field of Classification Search
CPC ........... H01M 50/3425; H01M 50/578; H01M 50/572; H01M 50/147; H01M 50/116; H01M 50/342; H01M 50/383; H01M 50/16; H01M 2200/20; H01M 2220/20; H01M 50/317; H01M 50/574; H01M 50/583

See application file for complete search history.

(56) References Cited

U.S. PATENT DOCUMENTS

| | | | | |
|---|---|---|---|---|
| 2013/0208405 | A1* | 8/2013 | Okada | H01G 9/12 361/521 |
| 2013/0314774 | A1* | 11/2013 | Page | H01L 31/0543 359/361 |
| 2015/0079426 | A1* | 3/2015 | Chen | H01M 10/0525 429/53 |
| 2015/0171411 | A1* | 6/2015 | Kobayashi | H01M 50/528 429/61 |
| 2016/0087318 | A1 | 3/2016 | Kim et al. | |
| 2017/0165513 | A1* | 6/2017 | Li | B60L 3/0046 |
| 2019/0181402 | A1* | 6/2019 | Bude | H01M 50/20 |

FOREIGN PATENT DOCUMENTS

| | | | | |
|---|---|---|---|---|
| CN | 106207252 | A | 12/2016 | |
| DE | 102013208135 | A1 * | 11/2014 | ............ H01M 50/10 |
| EP | 2793284 | | 10/2014 | |
| JP | 2014154449 | A | 8/2014 | |
| JP | 2015056380 | A | 3/2015 | |
| JP | 2016095929 | A | 5/2016 | |

OTHER PUBLICATIONS

Sewport, "What is Polytetrafluoroethylene (PTFE) Fabric: Properties, How it's Made and Where", <https://sewport.com/fabrics-directory/ptfe-eptfe-polytetrafluoroethylene-fabric>; online as of 2019 per Wayback Machine, see attached. (Year: 2019).*
G. A. Vincent, F. W. G. Fearon and T. Orbeck, "The behavior of silicone fluids and other insulating oils under a sustained arc," Conference on Electrical Insulation & Dielectric Phenomena—Annual Report 1973, pp. 89-96, doi: 10.1109/EIDP.1973.7683898. (Year: 1973).*
Barry Arkles, "Silicon Compounds, Silicon Esters", Kirk-Othmer Encyclopedia of Chemical Technology, Wiley, Dec. 4, 2000, <https://doi.org/10.1002/0471238961.1909120901181112.a02> (Year: 2000).*
English Translation of International Search Report from PCT/CN2018/088619 dated Sep. 7, 2018 (2 pages).
Communication Pursuant to Article 94(3) EPC from European Application No. 18824999.9 dated Aug. 7, 2020.

* cited by examiner

BATTERY COVER PLATE ASSEMBLY, SINGLE CELL BATTERY, BATTERY MODULE, POWER BATTERY PACK, AND ELECTRIC CAR

CROSS-REFERENCE TO RELATED APPLICATIONS

This application is based on International Application No. PCT/CN2018/088619, filed on May 28, 2018, which claims priority to and benefits of Chinese Patent Application No. 201710510436.9, filed on Jun. 28, 2017 and entitled "battery cover plate assembly, single battery, battery module, power battery pack, and electric vehicle". The entire contents of the above-referenced applications are incorporated herein by reference.

FIELD

The present disclosure relates to the field of batteries, and specifically, to a battery cover plate assembly, a single battery using the battery cover plate assembly, a battery module including the single battery, a power battery pack including the battery module, and an electric vehicle including the power battery pack.

BACKGROUND

A conventional battery generally includes an electrode inner terminal and an electrode outer terminal. The electrode inner terminal is configured to be electrically connected to a battery cell. The electrode outer terminal is configured to be connected to another single battery, battery module or the like, thereby implementing input and output of a current of the battery cell of the single battery. To improve safety performance of batteries and prevent severe safety problems such as battery burning and explosion caused by thermal runaway of the batteries due to overcharge, in the existing battery, the electrode inner terminal and the electrode outer terminal are electrically connected through a current interrupt structure. The current interrupt structure can be broken under the action of gas pressure, thereby disconnecting the current input and output of the single battery.

When the battery is abnormal and the current interrupt structure is broken, high voltages at positive and negative electrodes of the battery cause an arcing effect at the current interrupt structure. High temperature and sparks caused by the arcing effect may lead to dangerous accidents such as battery burning and explosion, and there are hidden safety risks.

SUMMARY

An objective of the present disclosure is to provide a battery cover plate assembly capable of improving safety performance of the battery, a battery using the battery cover plate assembly, a battery module including the battery, a power battery pack including the battery module, and an electric vehicle including the power battery pack.

The present disclosure provides a battery cover plate assembly, including a cover plate, an electrode terminal, a current interrupt structure, and an arc extinguishing portion. The electrode terminal is disposed on the cover plate and includes an electrode inner terminal and an electrode outer terminal. The electrode inner terminal is electrically connected to the electrode outer terminal through the current interrupt structure. The current interrupt structure is capable of disrupting the electrical connection between the electrode inner terminal and the electrode outer terminal under the action of a gas pressure. The arc extinguishing portion is configured to at least reduce an electric arc generated when the current interrupt structure disrupts the electrical connection between the electrode inner terminal and the electrode outer terminal.

In some embodiments, the current interrupt structure is broken under the action of the gas pressure to disrupt the electrical connection between the electrode inner terminal and the electrode outer terminal. The arc extinguishing portion is located on the current interrupt structure, to extinguish the electric arc generated when the current interrupt structure disrupts the electrical connection between the electrode inner terminal and the electrode outer terminal.

In some embodiments, the arc extinguishing portion is formed as an arc extinguishing coating applied to a surface of the current interrupt structure.

In some embodiments, the current interrupt structure includes a conductive member electrically connected to an outer end surface of the electrode inner terminal, and a flipping member connected between the conductive member and the electrode outer terminal. An outer peripheral edge of the flipping member is mounted on the cover plate in a sealed manner. The flipping member and the conductive member are capable of disrupting the electrical connection under the action of the gas pressure. The arc extinguishing coating includes a first coating applied to a surface, which faces the conductive member, of the flipping member, and a second coating applied to a surface, which faces the flipping member, of the conductive member.

In some embodiments, the arc extinguishing coating further includes a third coating applied to a surface, which faces the electrode outer terminal, of the flipping member.

In some embodiments, the flipping member is formed as a first sheet structure, and includes a first annular segment, an annular disk structure segment, and a second annular segment that are axially arranged in sequence from inside to outside. The conductive member is formed as a second sheet structure, and includes a circular structure segment, a circular notch segment, and a third annular segment that are radially arranged in sequence from inside to outside. The second annular segment is mounted on the cover plate in a sealed manner. The third annular segment is connected to the electrode inner terminal, so that the conductive member and the electrode inner terminal are electrically connected to each other. The circular structure segment is connected to the first annular segment, so that the conductive member and the flipping member are electrically connected to each other. The first coating is completely applied to the disk structure segment. The second coating is completely applied to the third annular segment. The third coating is completely applied to the disk structure segment.

In some embodiments, a boss is formed on the circular structure segment. The boss is electrically connected to an inner annular surface of the first annular segment through an annular welding spot.

In some embodiments, the arc extinguishing coating has a mean thickness of 0.01 mm to 0.03 mm.

In some embodiments, the arc extinguishing portion is high-voltage insulation silicone ketonic ester.

In some embodiments, the flipping member is further covered by a cover member. The cover member is electrically connected to the flipping member to form the electrode outer terminal.

In some embodiments, the electrode inner terminal is formed by a pole extending along an internal-external direction.

The present disclosure further provides a battery, including a case, and a battery cell accommodated in the case. The single battery is the battery cover plate assembly provided by the present disclosure. The battery cover plate assembly encapsulates the case.

The present disclosure further provides a battery module. The battery provided by the present disclosure is disposed inside the battery module.

The present disclosure further provides a power battery pack, including a pack body and one or more battery modules disposed inside the pack body. The battery module comprises one or more batteries, the battery is the battery module provided by the present disclosure.

The present disclosure further provides an electric vehicle. The power battery pack provided by the present disclosure is disposed inside the electric vehicle.

Through the foregoing technical solutions, when the battery is abnormal and the current interrupt structure disrupts the electrical connection between the electrode inner terminal and the electrode outer terminal, an arcing effect is generated due to high voltages at positive and negative electrodes, and an electric arc is released. In this case, the arc extinguishing portion disposed in the battery cover plate assembly can be used to prevent corona discharge and at least reduce the electric arc, so that gas between two disconnected structure members in the battery cover plate assembly is not easy to be broken down and high temperature and sparks generated from the arcing effect are reduced, thereby avoiding dangerous accidents such as battery burning and explosion and improving safety performance of the battery. Other features and advantages of the present disclosure are described in detail in the following detailed embodiments.

BRIEF DESCRIPTION OF THE DRAWINGS

The drawings are used to provide a further understanding of the present disclosure, and constitute a part of the specification. The drawings, along with the following embodiments, are used to explain the present disclosure, and do not constitute any limitation on the present disclosure. In the drawings.

DETAILED DESCRIPTION

The following describes specific embodiments of the present disclosure in detail with reference to the accompanying drawings. It should be understood that the specific embodiments described herein are merely used to describe and explain the present disclosure but are not intended to limit the present disclosure.

In the present disclosure, unless otherwise specified, location terms such as "up, down, left, and right" used in the present disclosure are generally defined based on figure plane directions of corresponding accompanying drawings, and the terms "inside and outside" refer to the interior and exterior of a corresponding component contour. Descriptions related to an outer end, an inner end, and an internal-external direction, for example, an inner terminal, an outer terminal, an inner end surface, and an outer end surface, are defined relative to the inside and outside of the battery along an axial direction of the pole, and the terms "inside and outside" relative to an annular member, for example, the outer periphery edge, is defined relative to a center of the annular member along the radial direction.

Figure 1:
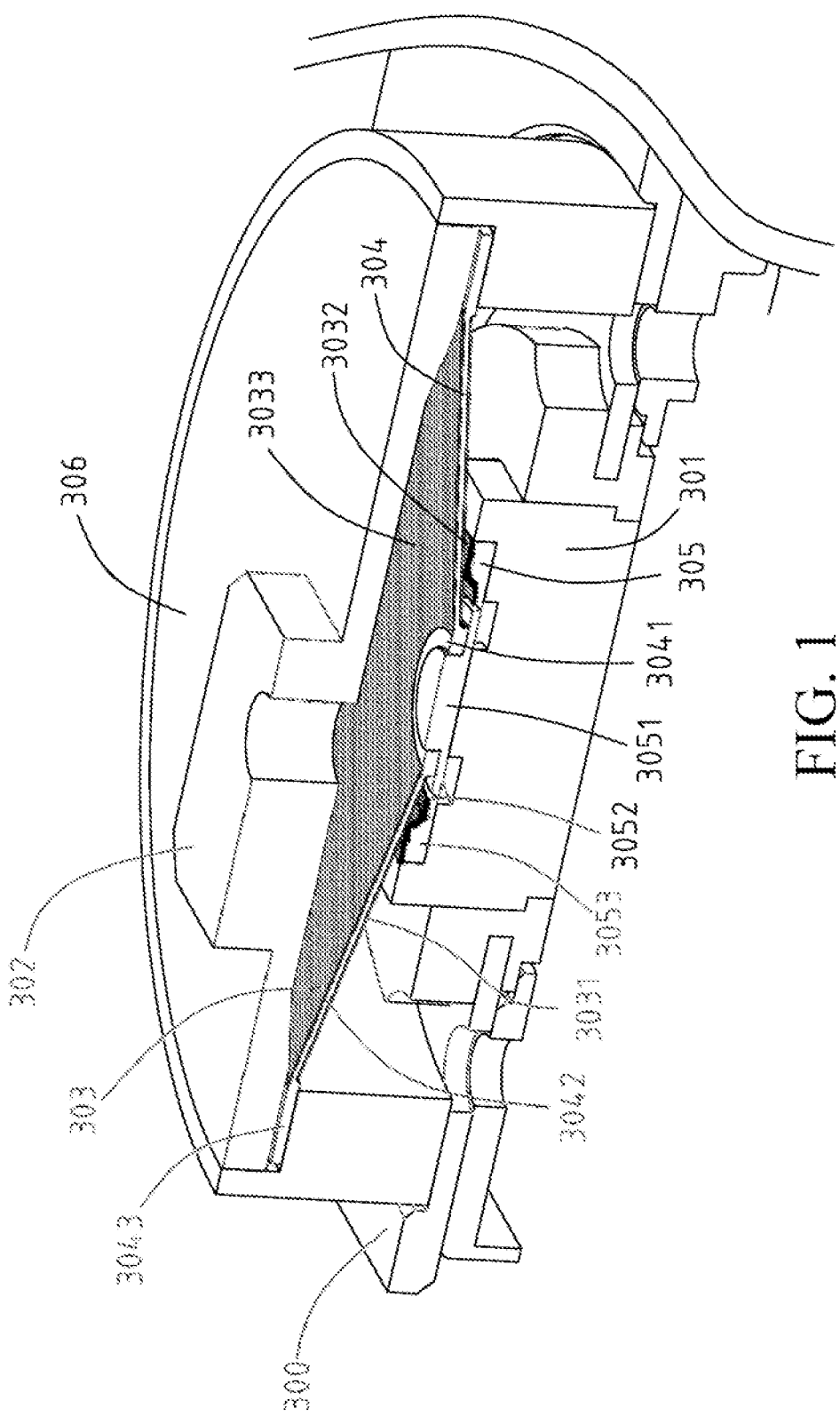
FIG. 1 is a three-dimensional cross-sectional view of a battery cover plate assembly according to a first embodiment of the present disclosure.
Figure 2:
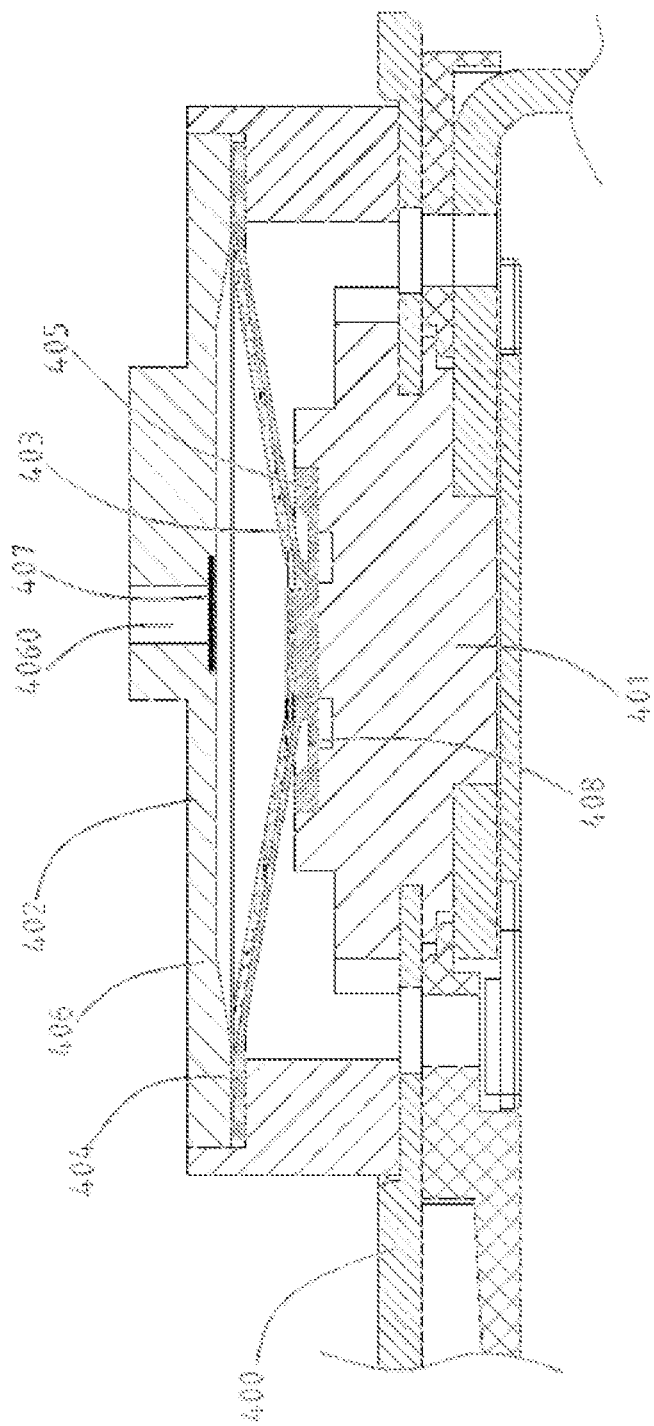
FIG. 2 is a three-dimensional cross-sectional view of a battery cover plate assembly according to a second embodiment of the present disclosure.

As shown in FIG. 1 and FIG. 2, the present disclosure provides technical solutions of a battery cover plate assembly, a single battery using the battery cover plate assembly, a battery module using the single battery, a power battery pack using the battery module, and an electric vehicle using the power battery pack. The single battery further includes a case and a battery cell accommodated inside the case. The cover plate assembly encapsulates the case. A plurality of single batteries is connected in series or in parallel to form the battery module. The battery module can be disposed inside a battery pack to form the power battery pack. In addition to the field of power battery packs, various technical solutions provided in the present disclosure can further be widely applied to other fields of batteries. Moreover, the battery cover plate assembly in the present disclosure may be an assembly that can be assembled on the case of the single battery to form the single battery, or may be a local structure that forms an integral structure with another portion, such as the battery cell, in the single battery, which is not limited in the present disclosure and belongs to the scope of protection of the present disclosure. For clarity of the technical solutions of the present disclosure, two embodiments are described in the present disclosure. However, the present disclosure is not limited to the two embodiments, and any combination and replacement can be made to the features in the two embodiments. In a first embodiment and a second embodiment of the present disclosure, the provided battery cover plate assembly may include a cover plate 300, 400, and an electrode terminal disposed on the cover plate 300, 400. The electrode terminal may further include an electrode inner terminal 301, 401, and an electrode outer terminal 302, 402. The electrode inner terminal 301, 401 is configured to be electrically connected to a battery cell. The electrode outer terminal 302, 402 is configured to be connected to another single battery or battery module, thereby implementing input and output of a current of the battery cell of the single battery. For safety, the electrode inner terminal 301, 401 and the electrode outer terminal 302, 402 are electrically connected through a current interrupt structure. The current interrupt structure can disrupt the electrical connection between the electrode inner terminal 301, 401 and the electrode outer terminal 302, 402 under the action of a gas pressure, thereby disconnecting the input and output of the current of the single battery. In various exemplary embodiments of the present disclosure, the current interrupt structure can be directly mounted on the electrode terminal. Specifically, the current interrupt structure is located between the electrode inner terminal 301, 401 and the electrode outer terminal 302, 402. In this case, the current interrupt structure, or the electrode inner terminal 301, 401, or the electrode outer terminal 302, 402 can be fixed on the cover plate 300, 400, so that the electrode terminal is fixed on the cover plate 300, 400. In addition, the current interrupt structure may alternatively be mounted on the cover plate 300, 400 directly. That is, when the current interrupt structure and the electrode terminal are arranged in a staggered manner, specifically, the current interrupt structure can be electrically connected, through some conductive members, to the electrode inner terminal 301, 401 or the electrode outer terminal 302, 402 mounted on the cover plate.

A gas pressure source used by the cover plate assembly in the first and second embodiments of the present disclosure may be a gas source independent of the inside of the battery, so as to establish the gas pressure for the current interrupt structure by generating gas in time, thereby breaking the current interrupt structure in time and improving the safety performance of the battery. Specifically, the gas may be generated by pre-storing a gas generation medium in the battery cover plate assembly. For example, a sealed cavity is established to store the gas generation medium, and the gas generation medium is located between the positive and negative electrodes, that is, a voltage is established for the gas generation medium. When an accident such as overcharge occurs on the battery, a voltage difference between the positive and negative electrodes of the battery gradually increases. In this way, it is only necessary to design the gas generation medium to be capable of generating gas when the voltage difference between the positive and negative electrodes of the battery exceeds a rated value, and thus the current interrupt structure can disrupt the electrical connection between the electrode inner terminal and the electrode outer terminal under the action of the gas pressure. In addition, the gas pressure source used by the cover plate assembly in the first and second embodiments of the present disclosure may alternatively be gas released inside the battery by, for example, an electrochemical reaction of an electrolyte when the battery is in a dangerous state such as overcharge. A large amount of gas is generated inside the battery, which increases the gas pressure inside the case. Alternatively, when the battery is abnormal in use, the temperature of the battery is thus increased, which increases the gas pressure inside the battery, thereby generating pressure power that drives the current interruption device. The current interrupt structures in the first and second embodiments of the present disclosure are both mechanical structures capable of sensing a gas pressure. The current interrupt structure is capable of cutting off the flowing current under the action of the gas pressure. Specifically, transmission of the current can be interrupted by disconnecting the internal members, thereby cutting off the charge and discharge of the battery in time.

To implement the objective of the present disclosure, in the first and second embodiments of the present disclosure, the battery cover plate assembly may further include an arc extinguishing portion. The arc extinguishing portion is configured to at least reduce an electric arc generated when the current interrupt structure disrupts the electrical connection between the electrode inner terminal and the electrode outer terminal. The arc extinguishing portion may be any arc extinguishing structure capable of at least reducing the electric arc generated when the current interrupt structure disrupts the electrical connection between the electrode inner terminal and the electrode outer terminal. For example, the arc extinguishing portion may be an arc extinguishing material, or may be an assembly including an arc extinguishing material and a mechanical member, which is not limited in the present disclosure and belongs to the scope of protection of the present disclosure.

It should be noted that, the phrase "at least reduce" herein may at least include the following two conditions: 1. The arc extinguishing portion can completely extinguish the electric arc generated when the current interrupt structure disrupts the electrical connection between the electrode inner terminal and the electrode outer terminal, so as to prevent any damage to any component on the battery cover plate assembly. For example, no component on the battery cover plate assembly is broke down by the electric arc or burned by the electric arc. 2. The arc extinguishing portion may alternatively reduce the electric arc generated when the current interrupt structure disrupts the electrical connection between the electrode inner terminal and the electrode outer terminal, so as to reduce energy of the generated electric arc, thereby preventing the electric arc from further propagation and diffusion. For example, some components on the battery cover plate assembly are possibly burned by the electric arc, but no component on the battery cover plate assembly is broke down by the electric arc.

In this case, when the battery is abnormal, and the current interrupt structure disrupts the electrical connection between the electrode inner terminal and the electrode outer terminal, the arcing effect is generated due to high voltages at positive and negative electrodes, and the electric arc is released. In this case, the arc extinguishing portion disposed in the battery cover plate assembly can be used to prevent corona discharge and at least reduce the electric arc, so that gas between two disconnected structure members in the battery cover plate assembly is not easy to be broken down and high temperature and sparks generated from the arcing effect are reduced, thereby avoiding dangerous accidents such as battery burning and explosion and improving safety performance of the battery.

In the present disclosure, the battery cover plate assemblies in the first and second embodiments are described in the following with reference to FIG. 1 and FIG. 2.

First, as shown in FIG. 1, in the first embodiment of the present disclosure, the arc extinguishing portion 303 may be an arc extinguishing material having an arc extinguishing function. Specifically, the arc extinguishing portion may be high-voltage insulation silicone ketonic ester. EccoGrease GR300 high-voltage insulation silicone grease is an insulation grease made of modified silicone oil, an ultrapure insulation filler, a function additive, and the like through a special craft. The insulation silicone ketonic ester, which has excellent high voltage resistance, waterproofing, and anti-creepage performance, is designed to be used for insulation, sealed lubrication, and moisture proofing of high-voltage power cable connection systems and electrical devices with 10 kv or higher voltage and can reduce surface aging of the material caused by unstable weather. An applicable temperature range is −40° C. to +200° C. The performance features of the insulation silicone ketonic ester are as follows: excellent electrical insulation and chemical stability, a high flash point, a low solidification point; a wide temperature operation range, where the consistence varies slightly with the temperature and the insulation silicone ketonic ester is never solidified; excellent lubricity and air-tightness, and good compatibility with most plastics and rubber; excellent water resistance, weather aging resistance, resistance against weak acid and weak base, and a long service life.

In addition, the arc extinguishing portion 303 may alternatively be another arc extinguishing material. For example, the arc extinguishing material may be arc extinguishing powder. Specifically, the arc extinguishing powder may include a composition of $SiO_2$ and a chloride. When the electric arc is generated, $SiO_2$ can instantly absorb heat of the electric arc, to prevent ions generated in the electric arc from arcing due to high temperature. The chloride is decomposed due to high temperature of the electric arc and simultaneously absorbs heat of the electric arc, to further reduce damage of the electric arc. Moreover, chloride ions are generated after the chloride is decomposed. The chloride ions achieve a good arc extinguishing effect when neutralizing ions generated by the electric arc. For example, in an embodiment, to ensure an optimal arc extinguishing effect, a mass fraction of $SiO_2$ in the composition is 80% to 95%, and a mass fraction of the chloride in the composition is 5% to 20%.

In addition, the arc extinguishing portion may alternatively be, for example, an arc extinguishing material known to a person skilled in the art. For example, the arc extinguishing material may be at least one of quartz sand, high-temperature silica gel, and high-temperature silicone.

The electrical connection between the electrode inner terminal and the electrode outer terminal is disrupted due to the action of the current interrupt structure. Specifically, the current may be cut off by breaking a self-structure of the current interrupt structure, or the current may be cut off by breaking a connection structure between the current interrupt structure and the electrode inner terminal, or the current may be cut off by breaking a connection structure between the current interrupt structure and the electrode outer terminal. In the present disclosure, to avoid affecting transmission of the current among the electrode inner terminal, the current interrupt structure, and the electrode outer terminal, and ensure sensitivity of the current interrupt structure, a weak structure capable of being broken under the action of the gas pressure can be disposed on the current interrupt structure, so that the connection structure between the current interrupt structure and the electrode inner terminal and the connection structure between the current interrupt structure and the electrode outer terminal are designed to be firmer. In this way, high sensitivity of the current interrupt structure is ensured, and reliable and stable current transmission is also ensured.

It should be noted that, the foregoing weak structure can be directly broken under the action of the gas pressure or can be broken under the indirect action of the gas pressure. For example, the gas pressure causes an action of a flipping member as follows, so that the flipping member breaks the weak structure. That is, the weak structure is broken under a tensile force of the flipping member. In addition, the weak structure can also be broken under the direct and indirect action of the gas pressure at the same time.

In this application, to effectively prevent battery burning and explosion due to arcing, the arc extinguishing portion 303 may be located on two structure members that are broken under the action of the gas pressure in the battery cover plate assembly. Specifically, when the current is cut off by breaking the self-structure of the current interrupt structure, the two structure members both belong to the self-structure of the current interrupt structure, and in this case, the arc extinguishing portion 303 may be only disposed on the current interrupt structure. That is, the current interrupt structure is broken under the action of the gas pressure to disrupt the electrical connection between the electrode inner terminal 301 and the electrode outer terminal 302. When the current is cut off by breaking the connection structure between the current interrupt structure and the electrode inner terminal, one of the two structure members is located on the current interrupt structure, and the other one is located on the electrode inner terminal. In this case, the arc extinguishing portion 303 may be disposed on the current interrupt structure and the electrode inner terminal and close to the connection structure between the current interrupt structure and the electrode inner terminal. When the current is cut off by breaking the connection structure between the current interrupt structure and the electrode outer terminal, one of the two structure members is located on the current interrupt structure, and the other one is located on the electrode outer terminal. In this case, the arc extinguishing portion 303 may be disposed on the current interrupt structure and the electrode outer terminal and close to the connection structure between the current interrupt structure and the electrode outer terminal.

Therefore, in various embodiments of the present disclosure, to effectively extinguish the electric arc in time, as shown in FIG. 1, the arc extinguishing portion 303 is located on the current interrupt structure, to extinguish the electric arc generated when the current interrupt structure disrupts the electrical connection between the electrode inner terminal 301 and the electrode outer terminal 302. In this case, when the self-structure of the current interrupt structure is broken to cut off the current transmission, it is convenient for the arc extinguishing portion 303 to completely suppress the arcing effect in time, thereby improving effectiveness and sensitivity of arc extinguishing.

Further, the arc extinguishing portion 303 is formed as an arc extinguishing coating applied to a surface of the current interrupt structure. Specifically, the arc extinguishing portion 303 may be sprayed on the surface of the current interrupt structure by a spray gun. Therefore, on the one hand, sufficient contact between the current interrupt structure and the arc extinguishing coating is ensured by applying the arc extinguishing coating to the current interrupt structure, thus improving the arc extinguishing effect. On the other hand, the arc extinguishing coating has a relatively light weight, and does not affect the timely current cutoff function of the current interrupt structure.

Further, to take the sensitivity of the current interrupt structure and the arc extinguishing effect into consideration, the arc extinguishing coating has a mean thickness of 0.01 mm to 0.03 mm. During assembly, the arc extinguishing coating may first be sprayed on the surface of the current interrupt structure by using a spraying tool, and then the current interrupt structure, the electrode inner terminal, and the electrode outer terminal are assembled to form the battery cover plate assembly.

In the second embodiment of the present disclosure, to facilitate processing of the flipping member 304 and protect the battery, as shown in FIG. 1, the current interrupt structure includes a conductive member 305 electrically connected to an outer end surface of the electrode inner terminal 301, and a flipping member 304 connected between the conductive member 305 and the electrode outer terminal 302. An outer peripheral edge of the flipping member 304 is mounted on the cover plate 300 in a sealed member. The flipping member 304 and the conductive member 305 are capable of disrupting the electrical connection under the action of the gas pressure. In this way, for example, when the battery is overcharged, the electrolyte or the gas generation medium inside the battery generates gas and then the gas pressure increases. Therefore, under the action of a particular gas pressure, the flipping member 304 disrupts the electrical connection to the conductive member 305 through a flipping action, so as to stop charging of the battery, prevent the gas pressure inside the battery from continuing to rise, and ensure the safety of the battery. In addition, some fracture structures may be disposed on the conductive member 305, to avoid the tedious processing for the flipping member 304. In addition, because the flipping member 304 and the electrode inner terminal 301 are electrically connected to each other through the conductive member 305, no special design is needed for the flipping member 304, thus facilitating manufacturing and assembly.

Further, to ensure that the arc extinguishing coating can effectively extinguish the electric arc in time when the battery works abnormally, as shown in FIG. 1, the arc extinguishing coating includes a first coating 3031 applied to a surface, which faces the conductive member 305, of the flipping member 304, and a second coating 3032 applied to a surface, which faces the flipping member 304, of the conductive member 305. That is, the arc extinguishing coating is applied to the surfaces, which are opposite to each other, of the flipping member 304 and the conductive member 305. Specifically, the first coating 3031 is applied to an inner end surface of the flipping member 304, and the second coating 3032 is applied to an outer end surface of the conductive member 305. In this way, when the battery works abnormally, the high voltages at the positive and negative electrodes of the battery are respectively applied to the conductive member 305 and the flipping member 304 directly. Therefore, a high voltage is formed between the conductive member 305 and the flipping member 304, and the electric arc effect occurs. In this case, the arc extinguishing coating between the conductive member and the flipping member may be used to reduce or absorb the heat generated by the electric arc effect and reduce kinetic energy of charged particles, thereby efficiently extinguishing the electric arc, avoiding arc expansion, and improving the safety of the battery.

Further, to prevent the electric arc from diffusing to the outside of the battery to cause a larger fire, as shown in FIG. 1, the arc extinguishing coating further includes a third coating 3033 applied to a surface, which faces the electrode outer terminal 302, of the flipping member 304. That is, the third coating 3033 may be applied to an outer end surface of the flipping member 304. Therefore, a "barrier" suppressing propagation of the electric arc is formed through the third coating 3033. The "barrier" is closer to the fracture of the current interrupt structure, so as to extinguish the electric arc in time, thus greatly improving the safety performance of the battery. Certainly, in another variation, the third coating 3033 may alternatively be applied to a surface, which faces the flipping member 304, of the electrode outer terminal 302. That is, the third coating 3033 may alternatively be applied to an inner surface of the electrode outer terminal 302.

Specifically, as shown in FIG. 1, the flipping member 304 is formed as a first sheet structure, and includes a first annular segment 3041, a disk structure segment 3042, and a second annular segment 3043 that are radially arranged in sequence from inside to outside. The conductive member 305 is formed as a second sheet structure, and includes a circular structure segment 3051, an annular notch segment 3052, and a third annular segment 3053 that are radially arranged in sequence from inside to outside. The second annular segment 3043 is mounted on the cover plate 300 in a sealed manner. The third annular segment 3053 is connected to the electrode inner terminal 301, so that the conductive member 305 and the electrode inner terminal 301 are electrically connected to each other. Specifically, to prevent a large current from fusing the connection structure between the third annular segment 3053 and the electrode inner terminal, the third annular segment 3053 and the electrode inner terminal may be connected through an annular welding spot. The circular structure segment 3051 is connected to the first annular segment 3041, so that the conductive member 305 and the flipping member 304 are electrically connected to each other. Further, to prevent the connection point between the conductive member 305 and the flipping member 304 from being fused by the large current and losing efficacy, a boss is formed on the circular structure segment 3051. The boss and an inner annular surface of the first annular segment 3041 are electrically connected through an annular welding spot, so as to ensure stability of the welding connection and prevent the connection point from being fused by the large current and losing efficacy.

The first coating 3031 is completely applied to the disk structure segment 3042. That is, the flipping member 304 includes an idle segment and a mounting segment. The mounting segment is a portion needing to be fixed on the cover plate 300 or the conductive member 305. Moreover, the mounting segment further includes a reserved portion for an operation space of mounting work by, for example, a welding torch. For example, the first annular segment 3041 and the second annular segment 3043 both are the mounting segment of the flipping member 304. In this way, by selectively applying the first coating 3031 to a surface of the idle segment of the flipping member 304 completely, utilization of the arc extinguishing coating can be increased and it is ensured that an effective coating area of the first coating 3031 is maximized, thereby saving costs and improving the arc extinguishing effect.

Similarly, to increase the utilization of the arc extinguishing coating, the third coating 3033 is completely applied to the disk structure segment 3042. That is, by selectively applying the third coating 3033 to the surface of the idle segment (that is, the disk structure segment 3042) of the flipping member 304 completely, it is ensured that an effective coating area of the first coating 3033 is maximized, thereby saving costs and improving the arc extinguishing effect.

To prevent the second coating 3032 from affecting sensitivity of the circular notch segment 3052, the second coating 3032 is completely applied to the third annular segment 3053. In this way, by only applying the second coating 3032 to the third annular segment 3053, on one hand, the second coating 3032 can be prevented from being applied to the circular notch segment 3052 to increase the thickness of the circular notch segment 3052, and on the other hand, the operation of spraying the coating can be avoided at positions with a limited operation space, for example, at the circular structure segment 3051.

To protect the current interrupt structure, the flipping member 304 is covered by a cover member 306. As shown in FIG. 1, when the current interrupt structure is located between the electrode inner terminal 301 and the electrode outer terminal 302, the cover member 306 may be electrically connected to the flipping member 304 to form the electrode outer terminal 302. That is, the cover member 306 is used as a conductive terminal for transmitting the current and a protection member covering the current interrupt structure. The cover member 306 may be made of a conductive material such as metal. Specifically, a protrusion connected to a conductive transmission member, such as an electrode lead piece, may be formed on an outer end surface of the cover member 306. The electrode lead piece can establish a current path, for example, between adjacent single batteries, or between adjacent battery modules, or with a load. In another variation, the cover member and the electrode outer terminal may be two independent members. For example, when the foregoing current interrupt structure is directly mounted on the cover plate 300, the flipping member 304 and the electrode outer terminal 302 are electrically connected through the cover member 306.

Further, to implement discharge of the foregoing gas to the outside of the battery, an air vent in communication with the outside may be formed on the cover member 306, so that after the flipping member 304 flips, the gas flows through the current interrupt structure and is eventually discharged through the air vent, thereby preventing battery explosion. In addition, the air vent on the cover member 306 can also allow the current interrupt structure to directly establish a pressure difference with the atmosphere, thereby facilitating the action of the flipping member.

In the present disclosure, the electrode inner terminal 301 may be formed by a pole extending along an internal-external direction. It should be noted that, the term "internal-external direction" herein is an internal-external direction along an axial direction of the pole.

The battery cover plate assembly according to the first embodiment of the present disclosure is described in the foregoing. Without departing from the idea of the present disclosure, the features in the first embodiment, such as the arc extinguishing material and the arc extinguishing coating, can be all applied to the second embodiment of the present disclosure. A battery cover plate assembly according to the second embodiment of the present disclosure is described in the following with reference to FIG. 2.

As shown in FIG. 2, the second embodiment of the present disclosure provides a battery cover plate assembly, including a cover plate 400, an electrode terminal, a current interrupt structure, and an arc extinguishing portion 403. In the second embodiment, further, the arc extinguishing portion 403 is located on a side, which faces the outside of the battery, of the current interrupt structure. That is, the arc extinguishing portion 403 is configured to prevent an electric arc, which is generated when the current interrupt structure disrupts an electrical connection between an electrode inner terminal 401 and an electrode outer terminal 402, from diffusing to the outside of the battery. In other words, the arc extinguishing portion 403 is a "barrier" that is disposed on the battery cover plate assembly and that isolates the interior and exterior of the battery, thereby effectively preventing the electric arc generated due to an arcing effect from diffusing to the outside of the battery when the battery works abnormally, and improving the safety performance of the battery.

It should be noted that, the arc extinguishing portion 403 is located on the side, which faces the outside of the battery, of the current interrupt structure, which may at least include the following two conditions: 1. When the current interrupt structure is located between the electrode inner terminal 401 and the electrode outer terminal 402, the arc extinguishing portion 403 may be disposed on a side, which faces the electrode outer terminal 402, of the current interrupt structure. This includes, but is not limited to, the following arrangement positions: the arc extinguishing portion 403 is disposed on a surface, which faces the electrode outer terminal 402, of the current interrupt structure, and/or, when a gap exists between the current interrupt structure and the electrode outer terminal 402, the arc extinguishing portion 403 is disposed in a cavity between the current interrupt structure and the electrode outer terminal 402, and/or, the arc extinguishing portion 403 is disposed on the electrode outer terminal 402. That is, the arc extinguishing portion 403 is only required to prevent the electric arc from diffusing to the outside of the battery. 2. When the current interrupt structure and the electrode terminal are arranged in a staggered manner, the arc extinguishing portion 403 may be disposed on a side, which faces the outside of the battery, of the current interrupt structure.

In the second embodiment, to protect a reliable arc extinguishing effect, the arc extinguishing portion 403 may be the foregoing composition of $SiO_2$ and a chloride. In this way, heat of the electric arc is absorbed by $SiO_2$, and the chloride is decomposed due to the high temperature of the electric arc and absorbs the heat of the electric arc, so as to minimize the diffusion of the electric arc. Moreover, chloride ions are generated after the chloride is decomposed. The chloride ions achieve a good arc extinguishing effect when neutralizing ions generated by the electric arc.

Further, to ensure an optimal arc extinguishing effect, a mass fraction of $SiO_2$ in the composition may be 80% to 95%, and a mass fraction of the chloride in the composition may be 5% to 20%.

Further, the chloride may include at least one of sodium chloride, potassium chloride, calcium chloride, and barium chloride.

The arc extinguishing portion 403 may be the foregoing high-voltage insulation silicone grease, quartz sand, high-temperature silica gel, and high-temperature silicone. It may be understood that, the arc extinguishing portion 403 may alternatively be another arc extinguishing matter that is known to a person skilled in the art, which is not limited in the present disclosure and belongs to the scope of protection of the present disclosure.

To protect the battery, as shown in FIG. 2, the current interrupt structure includes a flipping member 404 that is electrically connected between the electrode inner terminal 401 and the electrode outer terminal 402. The flipping member 404 acts under the action of the gas pressure to disrupt the electrical connection between the electrode inner terminal 401 and the electrode outer terminal 402. In this way, for example, when the battery is overcharged, the electrolyte or the gas generation medium inside the battery generates gas and then the gas pressure increases. Therefore, under the action of a particular gas pressure, the flipping member 404 disrupts the electrical connection between the electrode inner terminal 401 and the electrode outer terminal 402 through a flipping action, so as to stop charging of the battery, prevent the gas pressure inside the battery from continuing to rise, and ensure the safety of the battery. Specifically, the action of the flipping member 404 can disrupt the electrical connection to the electrode inner terminal 401, and can also disrupt the electrical connection to the electrode outer terminal 402. Alternatively, the action of the flipping member 404 causes its own structure to break.

Further, to ensure that the flipping member 404 is capable of flipping under the action of the gas pressure, as shown in FIG. 2, an outer peripheral edge of the flipping member 404 is mounted on the cover plate 400 in a sealed manner.

To effectively prevent the electric arc generated due to the arcing effect from diffusing to the outside of the battery, the arc extinguishing portion 403 is disposed on a surface, which faces the electrode outer terminal 402, of the flipping member 404. That is, the arc extinguishing portion 403 is closer to the flipping member 404, thereby extinguishing the electric arc at an initial stage and preventing the electric arc from diffusing to the outside of the battery. In another variation, the arc extinguishing portion 403 may alternatively be disposed in a cavity enclosed by the flipping member 404 and the electrode outer terminal. Alternatively, the arc extinguishing portion 403 is disposed on a surface, which faces the flipping member 404, of the electrode outer terminal 402.

To facilitate the flipping action of the flipping member 404 and improve the arc extinguishing efficiency of the arc extinguishing portion 403, the flipping member 404 is formed as a sheet structure, and the arc extinguishing portion 403 is evenly laid on a surface of the sheet structure. In FIG. 2, a circular structure segment in the middle of the conductive member 405 is nested with a first annular segment in the middle of the flipping member 404. In this case, the arc extinguishing portion 403 is also laid on an outer surface of the circular structure segment, that is, the arc extinguishing portion 403 may be laid on the entire outer surface of the current interrupt structure, and certainly, the arc extinguishing portion 403 may not be laid on an unexposed portion (for example, in FIG. 2, a second annular segment that is on the outermost side of the flipping member 404 radially and that is located between the cover member 406 and a transition ring 408). In this way, the arc extinguishing portion 403 can effectively suppress diffusion of the electric arc at each location of the flipping member 404 to the outside and ensure reliability of arc extinguishing. Specifically, the arc extinguishing portion 403 may be stuck to the surface of the sheet structure, so that the arc extinguishing portion 403 can be evenly laid on the surface of the sheet structure. In another variation, the arc extinguishing portion 403 may alternatively be formed as an arc extinguishing film adhered to the surface of the sheet structure. The arc extinguishing film can be made of an arc extinguishing material. Further, to avoid affecting the flipping action of the flipping member 404 and thus reducing sensitivity of the current interrupt structure, a laying thickness of the arc extinguishing portion 403 is less than 5 mm. When the laying thickness of the arc extinguishing portion 403 is excessively great, it is difficult for the flipping member 404 to flip under the action of a relatively small gas pressure.

In addition, to effectively prevent diffusion of the electric arc to the outside of the battery, the laying thickness of the arc extinguishing portion 403 needs to be greater than 1 mm, to ensure that a usage amount of the arc extinguishing portion 403 is sufficient to extinguish the electric arc.

To protect the current interrupt structure, the flipping member 404 may further be covered by a cover member 406. As shown in FIG. 2, when the current interrupt structure is located between the electrode inner terminal 401 and the electrode outer terminal 402, the cover member 406 may be electrically connected to the flipping member 404 to form the electrode outer terminal 402. That is, the cover member 406 is used as a conductive terminal for transmitting the current and a protection member covering the current interrupt structure. The cover member 406 may be made of a conductive material such as metal. Specifically, a protrusion connected to a conductive transmission member, such as an electrode lead piece, may be formed on an outer end surface of the cover member 406. The electrode lead piece can establish a current path, for example, between adjacent single batteries, or between adjacent battery modules, or with a load. In another variation, the cover member 406 and the electrode outer terminal 402 may be two independent members. For example, when the foregoing current interrupt structure is directly mounted on the cover plate, the flipping member and the electrode outer terminal are electrically connected through the cover member.

When an arc extinguishing material that is easy to lose efficacy when exposed to the air, such the foregoing composition of $SiO_2$ and the chloride, is used in the present disclosure, to protect the arc extinguishing material, as shown in FIG. 2, an air vent 4060 is formed on the cover member 406, and a waterproof breathable film 407 plugging the air vent 4060 is also disposed on the cover member 406. Specifically, the waterproof breathable film 407 may be fixed to the cover member 406 in any mechanical connection manner, such as sticking, welding, and screw connection, which is not limited in the present disclosure and belongs to the scope of protection of the present disclosure. In this way, when the battery works normally, the waterproof breathable film 407 prevents moisture and solid impurities in the air outside the battery from entering the cavity between the flipping member 404 and the cover member 406, thereby ensuring that the external impurities do not result in failure of the arc extinguishing material. In addition, because the waterproof breathable film 407 can allow gas to circulate, the flipping action of the flipping member 404 is not affected, that is, normal work of the current interrupt structure is not affected.

The waterproof breathable film 407 may be any functional film structure that allows gas to pass and intercepts water and that is known to a person skilled in the art. For example, in an embodiment, the waterproof breathable film 407 is a polytetrafluoroethylene film or a polyurethane film.

To improve sensitivity of the current interrupt structure, as shown in FIG. 2, the current interrupt structure may further include a conductive member 405 fixed on an outer end surface of the electrode inner terminal 401. The flipping member 404 is electrically connected to the conductive member 405. A notch 408 that can be broken under the action of the gas pressure is formed on the conductive member 405. The notch 408 is disposed around a connection point for connecting the flipping member 404. That is, by providing the notch 408 on the conductive member 405, tedious processing for the electrode inner terminal 401 is prevented. In addition, because the flipping member 404 and the electrode inner terminal 401 are electrically connected to each other through the conductive member 405, no special design is needed for the flipping member 404, which facilitates manufacturing and assembly. In addition, the self-structure of the conductive member 405 is broken along the notch 408 under the action of the gas pressure, thereby disconnecting the flipping member and the electrode inner terminal in time. In addition to the implementation of breaking the self-structure by using a reduction method such as the notch, it is also possible to implement the electrical disconnection by, for example, pulling out a welding spot between two members or breaking a fracture piece between the two members.

It should be noted that, the foregoing weak structure can be directly broken under the action of the gas pressure, or can be broken under the indirect action of the gas pressure. For example, the gas pressure causes an action of the flipping member, so that the flipping member breaks the weak structure. That is, the weak structure is broken under a tensile force of the flipping member. In addition, the weak structure can also be broken under the direct and indirect action of the gas pressure at the same time. In the present disclosure, the electrode inner terminal 401 is formed by a pole extending along an internal-external direction. It should be noted that, the term "internal-external direction" herein is an internal-external direction along an axial direction of the pole. The foregoing describes preferred embodiments of the present disclosure in detail with reference to the accompanying drawings, but the present disclosure is not limited to specific details in the foregoing embodiments. Many simple variations may be made to the technical solutions of the present disclosure within the scope of the technical conception of the present disclosure, and these simple variations all fall within the protection scope of the present disclosure.

It should be further noted that the specific technical features described in the foregoing specific embodiments can be combined in any appropriate manner provided that no conflict occurs. To avoid unnecessary repetition, various possible combination manners are not described in the present disclosure.

In addition, various different embodiments of the present disclosure may also be combined arbitrarily. Such combinations shall also be considered as the content disclosed in the present disclosure provided that these combinations do not depart from the concept of the present disclosure.

What is claimed is:

1. A battery cover plate assembly, comprising a cover plate, an electrode terminal, a current interrupt structure, and an arc extinguishing portion formed as an arc extinguishing coating applied to a surface of the current interrupt structure, wherein:
the electrode terminal is disposed on the cover plate and comprises an electrode inner terminal and an electrode outer terminal;
the electrode inner terminal and the electrode outer terminal are electrically connected through the current interrupt structure;
the current interrupt structure is cut off under the action of a gas pressure to disrupt an electrical connection between the electrode inner terminal and the electrode outer terminal under an action of the gas pressure;
the arc extinguishing portion extinguishes an electric arc generated when the current interrupt structure disrupts the electrical connection between the electrode inner terminal and the electrode outer terminal;
the current interrupt structure comprises a conductive member electrically connected to an outer end surface of the electrode inner terminal, and a flipping member connected between the conductive member and the electrode outer terminal;
an outer peripheral edge of the flipping member is mounted on the cover plate in a sealed manner;
the flipping member and the conductive member disrupt the electrical connection under the action of the gas pressure; and
the arc extinguishing coating comprises a first coating applied to a first surface of the flipping member, and a second coating applied to a second surface of the conductive member, the first surface faces the conductive member and the second surface faces the flipping member.

2. The battery cover plate assembly according to claim 1, wherein the arc extinguishing coating further comprises a third coating applied to a third surface of the flipping member, the third surface faces the electrode outer terminal.

3. The battery cover plate assembly according to claim 2, wherein the flipping member is formed as a first sheet structure and comprises a first annular segment, an annular disk structure segment, and a second annular segment that are radially arranged in sequence from inside to outside, the conductive member is formed as a second sheet structure and comprises a circular structure segment, an annular notch segment, and a third annular segment that are radially arranged in sequence from inside to outside, the second annular segment is mounted on the cover plate in a sealed manner, the third annular segment is connected to the electrode inner terminal, so that the conductive member and the electrode inner terminal are electrically connected to each other, the circular structure segment is connected to the first annular segment, so that the conductive member and the flipping member are electrically connected to each other, the first coating is completely applied to the disk structure segment, the second coating is completely applied to the third annular segment, and the third coating is completely applied to the disk structure segment.

4. The battery cover plate assembly according to claim 3, wherein a boss is formed on the circular structure segment, and the boss is electrically connected to an inner annular surface of the first annular segment through an annular welding spot.

5. The battery cover plate assembly according to claim 1, wherein the arc extinguishing coating has a mean thickness of 0.01 mm to 0.03 mm.

6. The battery cover plate assembly according to claim 1, wherein the arc extinguishing portion is high-voltage insulation silicone ester.

7. The battery cover plate assembly according to claim 1, wherein the flipping member is further covered by a cover member, and the cover member is electrically connected to the flipping member to form the electrode outer terminal.

8. The battery cover plate assembly according to claim 7, wherein an air vent is formed on the cover member, and a waterproof and breathable film is disposed on the cover member to plug the air vent.

9. The battery cover plate assembly according to claim 1, wherein the electrode inner terminal (301) is formed by a pole extending along an internal-external direction.

10. A battery, comprising a case, and a battery cell accommodated in the case, wherein the single battery further comprises the battery cover plate assembly according to claim 1, and the battery cover plate assembly encapsulates the case.

11. A power battery pack, comprising a pack body and one or more battery modules disposed inside the pack body, wherein the battery module comprises one or more batteries, wherein the battery is the battery according to claim 10.

* * * * *